UNITED STATES PATENT OFFICE.

STANLEY C. PETERS, OF BRIDGEPORT, WASHINGTON.

COMPOSITION OF MATTER.

1,035,729.     Specification of Letters Patent.     Patented Aug. 13, 1912.

No Drawing.     Application filed August 3, 1911. Serial No. 642,198.

*To all whom it may concern:*

Be it known that I, STANLEY C. PETERS, a citizen of the United States, residing at Bridgeport, in the county of Douglas, State of Washington, have invented certain new and useful Improvements in Compositions of Matter; and I do hereby declare the following to be a full, clear, and exact description of the invention, such as will enable others skilled in the art to which it appertains to make and use the same.

My invention relates to new and useful improvements in chemical compounds and more especially to investment compounds used by jewelers, opticians, dentists and the like in high heat work such as soldering together of precious metals, such as gold, silver, platinum and the like and the object of my invention is to improve the efficiency of compounds of the above described character. These compounds are usually made up in powder form and when used are moistened with water to form a paste or putty which is then placed around whatever metal or metals which are to be exposed to the heat. With the compound of this class now in the market it is absolutely essential that the investment so made be exposed to the air for a certain length of time to permit it to set before exposing it to the flame.

A further object of my invention therefore is to provide a compound which in use, may be immediately exposed to the flame, thus avoiding loss of valuable time.

My improved compound is made up of the following ingredients, which are preferably mixed in the proportions stated:

| | | |
|---|---|---|
| Fire clay | 287 | grains. |
| Fullers' earth | 243 | " |
| Carbonate of magnesia | 31 | " |
| Sulfate of sodium | 60 | " |
| Pulverized mica | 12 | " |
| Ground asbestos | 336 | " |
| Borax | 10 | " |

The fire clay which need be only commercially pure is dried and then ground to a powder and the sulfate of sodium and mica are also ground to a powder. These three ingredients are then mixed with the fullers' earth, carbonate of magnesia and pulverized borax. The ground asbestos is then slowly added and throughly mixed when the compound is ready for use, the proportions above given being sufficient to form 979 grains of finished product. In use the compound so formed is mixed with a small amount of water to form a paste of putty like consistency and then employed in the manner well known to the art, with the exception that the investment formed therewith need not be exposed to the air for any length of time before applying the heat of the flame.

It will be understood that I do not wish in any way to limit myself to the exact proportions above given, as said proportions may be slightly varied to adapt the compound for use with various metals.

To obtain the best results the fullers' earth, carbonate of magnesia, asbestos and borax should all be pure while the fire clay, sulfate of sodium and mica need only be commercially pure.

What I claim is:—

A composition of the above described character, comprising a mixture of fire clay, fullers' earth, carbonate of magnesia, sulfate of sodium, pulverized mica, ground asbestos, and pulverized borax.

In testimony whereof, I affix my signature, in presence of two witnesses.

STANLEY C. PETERS.

Witnesses:
I. T. MAHANEY,
JOHN JOHNSON.